(12) United States Patent
Deng et al.

(10) Patent No.: US 11,367,128 B2
(45) Date of Patent: Jun. 21, 2022

(54) SMART DISPLAY APPARATUS AND SMART DISPLAY METHOD

(71) Applicant: BOE TECHNOLOGY GROUP CO., LTD., Beijing (CN)

(72) Inventors: Wei Deng, Beijing (CN); Hongyan Pei, Beijing (CN); Xue Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 328 days.

(21) Appl. No.: 16/605,877

(22) PCT Filed: Feb. 28, 2019

(86) PCT No.: PCT/CN2019/076487
§ 371 (c)(1),
(2) Date: Oct. 17, 2019

(87) PCT Pub. No.: WO2019/223387
PCT Pub. Date: Nov. 28, 2019

(65) Prior Publication Data
US 2021/0366027 A1    Nov. 25, 2021

(30) Foreign Application Priority Data

May 25, 2018  (CN) .......................... 201810517037.X (51) Int. Cl.
*G06Q 30/06* (2012.01)
*G02B 27/00* (2006.01)
(Continued)

(52) U.S. Cl.
CPC ..... *G06Q 30/0641* (2013.01); *G02B 27/0093* (2013.01); *G02B 27/0101* (2013.01);
(Continued)

(58) Field of Classification Search
CPC ............ G06Q 30/0641; G02B 27/0093; G02B 27/0101; G02B 2027/014;
(Continued)

(56) References Cited

U.S. PATENT DOCUMENTS

2013/0316767 A1* 11/2013 Cai .......................... A47F 11/06
455/566
2014/0098088 A1    4/2014 Ryu
(Continued)

FOREIGN PATENT DOCUMENTS

CN    103425445    12/2013
CN    103714749    4/2014
(Continued)

*Primary Examiner* — Amit Chatly
(74) *Attorney, Agent, or Firm* — Leason Ellis LLP (57) ABSTRACT

A smart display apparatus and a smart display method are provided. The smart display apparatus includes: a transparent display screen; a commodity position acquiring module configured to acquire position information of a plurality of commodities; and a control processing unit including a commodity determining unit and a control display unit; the commodity determining unit is configured to determine a recommended commodity; and the control display unit is configured to control the transparent display screen to display a first image of the recommended commodity, and configured to control the transparent display screen to display a commodity recommending mark according to the position information of the recommended commodity so as to indicate a customer to observe the recommended commodity through the transparent display screen.

20 Claims, 3 Drawing Sheets

(51) Int. Cl.
*G02B 27/01* (2006.01)
*G06F 3/01* (2006.01)
*G06F 3/14* (2006.01)
*G06T 11/60* (2006.01)
*G06V 40/10* (2022.01)
*G01D 21/02* (2006.01)

(52) U.S. Cl.
CPC ............... *G06F 3/013* (2013.01); *G06F 3/14* (2013.01); *G06T 11/60* (2013.01); *G06V 40/10* (2022.01); *G01D 21/02* (2013.01); *G02B 2027/014* (2013.01); *G02B 2027/0141* (2013.01)

(58) Field of Classification Search
CPC ... G02B 2027/0141; G06F 3/013; G06F 3/14; G06K 9/00362; G06T 11/60; G01D 21/02
See application file for complete search history.

(56) References Cited

U.S. PATENT DOCUMENTS

2017/0053158 A1*  2/2017  Kim .................... G06F 3/0482
2018/0217678 A1   8/2018  Yun et al.

FOREIGN PATENT DOCUMENTS

| | | |
|---|---|---|
| CN | 104272371 | 1/2015 |
| CN | 205594344 | 9/2016 |
| CN | 107209962 | 9/2017 |
| CN | 107247759 | 10/2017 |
| CN | 107346486 | 11/2017 |
| CN | 206639208 | 11/2017 |
| CN | 108764998 | 11/2018 |

\* cited by examiner

SMART DISPLAY APPARATUS AND SMART DISPLAY METHOD

CROSS-REFERENCE TO RELATED APPLICATIONS

This application is a U.S. National Stage Application under 35 U.S.C. § 371 of International Patent Application No. PCT/CN2019/076487, filed Feb. 28, 2019, which claims priority to the Chinese patent application No. 201810517037.X, filed on May 25, 2018, both of which are incorporated by reference in their entireties as part of the present application.

TECHNICAL FIELD

Embodiments of the present disclosure relate to a smart display apparatus and a smart display method.

BACKGROUND

Display apparatuses such as a display window play a very important role in the display of a store, store image and brand image are generally displayed to customers through the window, and creativity and ingenuity of design on display window are main factors attracting customers to enter the store. The display windows with various styles and different contents are effective stages of pushing stores and product images to the sights of customers, and a good display window design is an effective and direct means of improving popularity of the store.

A conventional display window generally displays through glass. The conventional display window illustrates a small amount of commodities, has a single display effect, cannot fully display characteristics of the store, and does not form a good interaction with customers.

SUMMARY

Embodiments of the present disclosure provide a smart display apparatus and a smart display method.

At least one embodiment of the present disclosure provides a smart display apparatus, which includes: a transparent display screen; a commodity position acquiring module configured to acquire position information of a plurality of commodities; and a control processing unit including a commodity determining unit and a control display unit, the commodity determining unit is configured to determine a recommended commodity; and the control display unit is configured to control the transparent display screen to display a first image of the recommended commodity, and is configured to control the transparent display screen to display a commodity recommending mark according to the position information of the recommended commodity so as to indicate a customer to observe the recommended commodity through the transparent display screen.

In one or more embodiments of the present disclosure, the commodity recommending mark is a frame, an interior of the frame is transparent, and the recommended commodity is included in the frame.

In one or more embodiments of the present disclosure, the smart display apparatus further includes an information sensing unit configured to sense external reference information related to recommendation of the commodities, and the commodity determining unit is configured to determine the recommended commodity according to the external reference information.

In one or more embodiments of the present disclosure, the information sensing unit includes an eye movement detecting module, and the eye movement detecting module is configured to detect an eye position of the customer and a viewing point of the customer on the transparent display screen.

In one or more embodiments of the present disclosure, the commodity determining unit is further configured to: determine a commodity observed by the customer through the transparent display screen, according to the eye position and the viewing point of the customer, which are detected by the eye movement detecting module, and the position information of the plurality of commodities, and determine the observed commodity as the recommended commodity; or the commodity determining unit is further configured to: connect the eye position with the viewing point of the customer, prolong a connection line of the eye position and the viewing point, and determine a commodity intersected with a prolonged line of the connection line as the recommended commodity.

In one or more embodiments of the present disclosure, the frame is provided with the viewing point as a center.

In one or more embodiments of the present disclosure, the information sensing unit includes an image acquiring module configured to acquire a second image of a customer passing region; the commodity determining unit is further configured to: acquire the second image, judge whether the second image of the customer passing region includes the customer or not, and if the second image of the customer passing region includes the customer, analyze the second image of the customer passing region to obtain customer information, and determine the recommended commodity according to the customer information.

In one or more embodiments of the present disclosure, the control display unit is further configured to: synthesize the first image of the recommended commodity and the second image of the customer passing region into a third image, in a case that the second image of the customer passing region includes the customer; and control the transparent display screen to display the third image.

In one or more embodiments of the present disclosure, the third image includes a virtual wearing image.

In one or more embodiments of the present disclosure, the information sensing unit includes: at least one selected from a group consisting of a human body infrared sensor, a weighing sensor and an ultrasonic sensor.

In one or more embodiments of the present disclosure, the smart display apparatus further includes a communication interface communicatively connected to the control processing unit, and the communication interface is configured to: receive the customer information from the control processing unit and information of the recommended commodity, and send the customer information and the information of the recommended commodity to an external electronic device; and/or receive information related to the recommended commodity from the external electronic device, and transmit the information related to the recommended commodity to the control processing unit.

In one or more embodiments of the present disclosure, the control processing unit includes a processor or a specialized electronic chip.

In one or more embodiments of the present disclosure, the commodity position acquiring module includes a storage device, or the commodity position acquiring module includes a Radio Frequency Identification (RFID) attached to a commodity and a plurality of RF readers arranged on the smart display apparatus.

At least one embodiment of the present disclosure further provides a smart display method, which includes: acquiring position information of a plurality of commodities; determining a recommended commodity; controlling a transparent display screen to display a first image of the recommended commodity; and controlling the transparent display screen to display a commodity recommending mark according to the position information of the recommended commodity so as to indicate a customer to observe the recommended commodity through the transparent display screen.

In one or more embodiments of the present disclosure, the method further includes: sensing external reference information related to recommendation of the commodities, and the determining the recommended commodity includes: determining the recommended commodity according to the external reference information.

In one or more embodiments of the present disclosure, the method further includes: detecting an eye position of the customer and a viewing point of the customer on the transparent display screen, and the determining the recommended commodity further includes: determining a commodity observed by the customer through the transparent display screen, according to the eye position and viewing point of the customer that are detected and the position information of the plurality of commodities, and determining the observed commodity as the recommended commodity.

In one or more embodiments of the present disclosure, the sensing the external reference information related to recommendation of the commodities includes: acquiring a second image of a customer passing region; the determining the recommended commodity includes: acquiring the second image of the customer passing region, judging whether the second image of the customer passing region includes the customer or not, and if the second image of the customer passing region includes the customer, analyzing the second image of the customer passing region to obtain customer information, and determining the recommended commodity according to the customer information.

In one or more embodiments of the present disclosure, the transparent display screen is located between the customer passing region and the plurality of commodities.

BRIEF DESCRIPTION OF THE DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

This specification of the present disclosure may use terms "in an embodiment", "in another embodiment", "in yet another embodiment" or "in other embodiments", which all may denote one or more of the same or different embodiments according to the present disclosure. It should be noted that in the full text of the specification, the same reference signs denote the same or similar components, and unnecessary repeated descriptions are omitted. Moreover, in the specific embodiments, a component appearing in a singular form does not exclude that it may appear in a multiple (plural) form.

A traditional smart display window is designed to have a function of recommending commodities to customers, for example, it can provide virtual wearing images of the commodities for the customer, however, it merely displays a limited number of real commodities with a single effect, or merely provides virtual pictures of the commodities (even though they are virtual try-on pictures), and those smart display windows are still not attractive enough for the customers and do not have a good interaction with the customers.

By research, inventor(s) found that: attraction to a customer is not only from a virtual experience effect (e.g., the virtual wearing image) of the customer for the commodity, but also from details (such as real color, quality sense and texture) of a real commodity; therefore, it is necessary to provide a smart display apparatus which can provide a display effect combined virtual with real of the virtual experience effect for the commodity and the real commodity, so as to further attract the customer and improve intersection with the customer.

Figure 1:
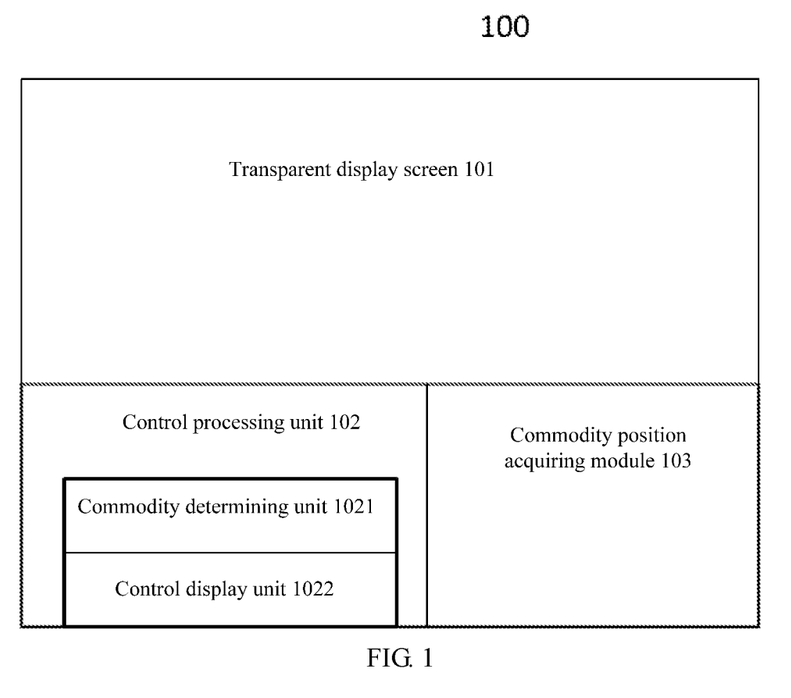
FIG. 1 is a structural diagram of a smart display apparatus provided by an embodiment of the present disclosure.

FIG. 1 illustrates a structural diagram of a smart display apparatus 100 provided by an embodiment of the present disclosure. The smart display apparatus 100 includes: a transparent display screen 101, a control processing unit 102 and a commodity position acquiring module 103.

The transparent display screen 101 has a characteristic of transparent display, that is, it not only can display exhibits behind the transparent display screen 101, but also is a display screen itself that can display different images as required under the control of the control processing unit 102. For example, the transparent display screen 101 can display, for example, recommended commodities, promotion videos and exhibits behind the display screen.

The commodity position acquiring module 103 can acquire position information of a plurality of commodities.

In an embodiment, the commodity position acquiring module 103 is a storage device which may include a Read Only Memory (ROM), a flash memory, a Random Access Memory (RAM), a Dynamic Random Access Memory (DRAM) such as a Synchronous DRAM (SDRAM) or a Rambus DRAM, a static memory (e.g., a flash memory and a static DRAM) and the like, a user can manually input commodity positions into the commodity position acquiring module 103, the fixed commodity positions may also be stored in the commodity position acquiring module 103 in advance. In the case of storing the fixed commodity positions in the commodity position acquiring module 103 in advance, the user needs to place actual commodities at predetermined positions.

The commodity position acquiring module 103 (the storage device) may be integrated in the control processing unit 102, or may be independent of the control processing unit 102.

In another embodiment, the commodity position acquiring module 103 may include a Radio Frequency Identification (RFID) attached to a commodity and a plurality of RF readers arranged on the smart display apparatus (e.g., fixedly arranged behind the transparent display screen 101). Each RF reader can scan the surroundings at a predetermined interval, positions of the RF readers of a certain RFID are obtained by scanning, a position of the RFID can be obtained, so as to obtain a position of a commodity to which the RFID is attached. Therefore, the commodity can be freely moved, it is merely an example, and the commodity position acquiring module 103 also has other implementation modes so as to determine positions of commodities which can be freely moved.

When necessary, the control processing unit 102 can read the position information of the plurality of commodities from the commodity position acquiring module 103.

The control processing unit 102 includes: a commodity determining unit 1021 and a control display unit 1022.

The commodity determining unit 1021 is configured to determine a recommended commodity. There may be various commodity recommendation strategies, and for example, when recommendation is carried out according to a popular new product in season, the popular new product in season is displayed on the transparent display screen 101 as the recommended commodity. Moreover, the promotion video may also be regarded as a set of the recommended commodities. In other embodiments, the commodity determining unit 1021 may also be configured to determine the recommended commodity according to external reference information and/or customer information and/or other information and the like. The customer is a subject of the recommended commodity.

The control display unit 1022 is configured to control the transparent display screen 101 to display a first image 109 (with reference to FIG. 3) of the recommended commodity and display a commodity recommending mark on the transparent display screen 101 for indicating the customer to observe the recommended commodity (i.e., a real commodity corresponding to the first image) through the transparent display screen 101. In some embodiment, the commodity recommending mark can be illustrated as an arrow or finger icon, and points to the recommended commodity observed by the customer through the transparent display screen 101.

The control processing unit 102, for example, may be implemented by a processor with signal processing capacity, such as a single chip microcomputer, a microprocessor, a microcontroller or a state machine and the like. The processor can implement functions of the commodity determining unit 1021 and the control display unit 1022 by operating computer instructions which can be stored on a memory. Or, the memory storing the computer instructions can be integrated into the processor.

In other alternative embodiments, the control processing unit 102 (including the commodity determining unit 1021 and the control display unit 1022) may be implemented by a specialized electronic chip, e.g., a Digital Signal Processor (DSP), an Application Specific Integrated Circuit (ASIC), a Field Programmable Gate Array (FPGA) or other programmable logic devices and the like. For example, the control display unit 1022 may include a Graphic Processing Unit (GPU) for controlling display of a transparent display.

In an alternative solution, the control processing unit 102 may also be implemented as a combination of computation devices, e.g., a combination of the DSP and a multiprocessor, a combination of a plurality of multiprocessors, a combination of one or more multiprocessors combined with a kernel of the DSP, or any other such structures. In another alternative solution, some steps or methods of the control processing unit 102 may be executed by a circuit special for given functions.

When the image of the commodity is provided, the commodity recommending mark points to the real commodity, and thus, the image of the recommended commodity is associated with the actual commodity, so that the customer can observe a display effect combined virtual with real for the commodity and then the customer can simultaneously pay attention to the details of the actual commodity. The smart display apparatus provided by the embodiments of the present disclosure can combine virtuality with reality, thereby greatly promoting attraction of the commodity to the customer and reinforcing interactivity.

By the smart display window design, not only can representative products in a store be displayed, but also the customers can know and experience the style, collocation and the like of the store before entering the store, so as to attract the customers, save shopping time of the customer and increase attraction and visitors flow rate of the store.

In an embodiment of the present disclosure, the commodity recommending mark is a frame with a transparent interior, and the frame is positioned, so that the recommended commodity is included in the middle portion of the frame from the customer's line of sight. Therefore, the recommended real commodity can be strikingly and clearly illustrated in front of the customer, so as to promote the interest of the customer in the commodity.

Figure 2:
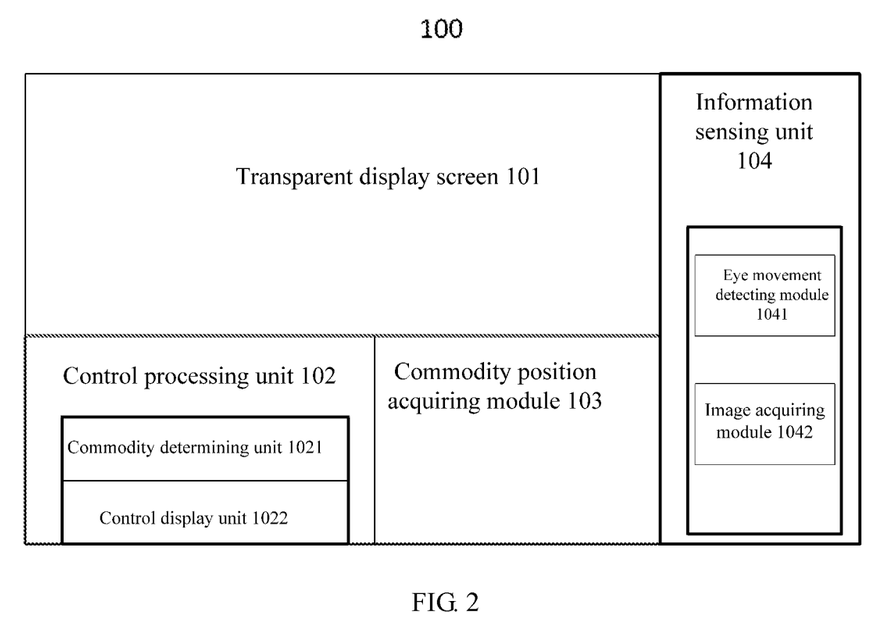
FIG. 2 is a structural diagram of a smart display apparatus provided by another embodiment of the present disclosure.

FIG. 2 is a structural diagram of a smart display apparatus provided by another embodiment of the present disclosure. As illustrated in FIG. 2, the apparatus 100 may further include an information sensing unit 104.

The information sensing unit 104 is configured to sense external reference information, and the commodity determining unit 1021 can be configured to determine the recommended commodity according to the external reference information sensed by the information sensing unit 104.

The external reference information covers various information related to recommendation of the commodity, including but not limited to a customer image, an environment temperature, a weather change and the like. For example, the information sensing unit 104 includes a temperature sensor (not illustrated), and the temperature sensor senses the environment temperature. The commodity determining unit 1021 determines the recommended commodity according to a temperature value sensed by the temperature sensor. For example, in summer, when the temperature is high (e.g., above 35° C.), compared to a case when the temperature is slightly low (e.g., below 35° C.), cooler dressing up (such as a miniskirt, shorts and the like) is recommended. For example, the information sensing unit 104 includes a humidity sensor configured to sense an external environment humidity, and if the humidity is higher than a threshold (e.g., 80%, 90% or above), it is judged that the day may be a rainy day, and then dressing up more suitable for the rainy day is recommended.

Figure 3:
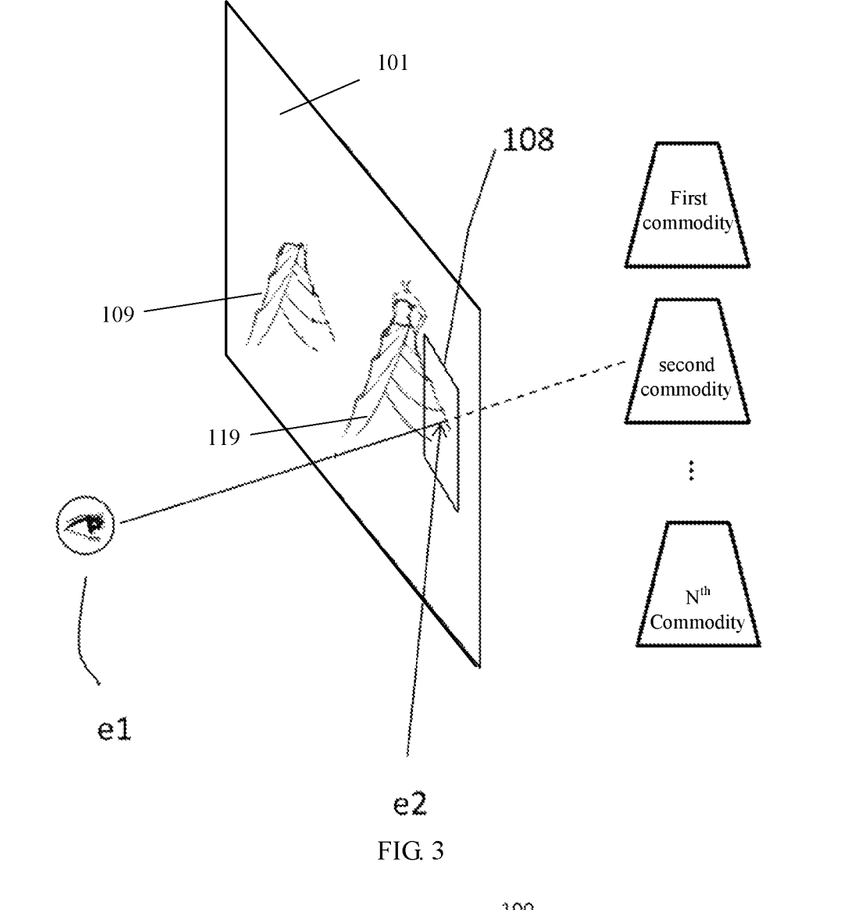
FIG. 3 is a schematic diagram in which a recommended commodity determined by eyes and a viewing point of a customer is displayed through a smart display apparatus provided by an embodiment of the present disclosure, and meanwhile a display mark on a transparent display screen is illustrated.

In an embodiment of the present disclosure, as illustrated in FIG. 2, the information sensing unit includes an eye movement detecting module 1041, and the eye movement detecting module 1041 is configured to detect an eye position e1 of the customer and a viewing point e2 of the customer on the transparent display screen 101 (as illustrated in FIG. 3).

The eye movement detecting module 1041 may be implemented by adopting a desktop-type eye movement detection device on sale in the market, without limited thereto, and may be any specific eye movement detecting module, as long as the eye movement detecting module 1041 can detect the eye position e1 of the customer and the viewing point e2 of the customer on the transparent display screen 101.

After the eye position e1 of the customer and the viewing point e2 of the customer on the transparent display screen 101 are detected, the commodity determining unit 1021 can determine a commodity observed by the customer through the transparent display screen according to the eye position e1 and the viewing point e2 of the customer, which are detected by the eye movement detecting module 1041, as well as the position information of the plurality of commodities, and determine the observed commodity as the recommended commodity.

FIG. 3 is a schematic diagram in which a recommended commodity determined by eyes and a viewing point of a customer is displayed through a smart display apparatus provided by an embodiment of the present disclosure, and meanwhile a display mark on a transparent display screen is illustrated.

As illustrated in FIG. 3, in an embodiment, a commodity determining unit 1021 can connect an eye position with the viewing point of the customer, prolong a connection line between the eye position and the viewing point and determine a second commodity intersected with a prolonged line of a connection line as a recommended commodity. Then, a control display unit controls the transparent display screen 101 to display a first image of the second commodity used as the recommended commodity and display a corresponding commodity recommending mark 108.

Therefore, the commodity to which the customer really pays attention is determined in real time by an eye movement condition of the customer, and is presented as a recommended commodity in a virtual and real combined way, so that recommendation of the commodity further accords with real preferences of the customer and interestingness of the customer is promoted.

In an embodiment, as illustrated in FIG. 3, the frame takes the viewing point as a center, so that the commodity to which the customer pays attention is accurately marked. In an embodiment of the present disclosure, an information sensing unit may include: an image acquiring module 1042 which is configured to acquire a second image including the customer. The commodity determining unit 1021 can acquire the second image acquired by the image acquiring module 1042, detect customer information according to the second image and determine the recommended commodity according to the customer information.

The customer information may include, but is not limited to, at least one selected from a group consisting of a height, a body shape, measurements and a wearing style.

On the basis of the acquired second image, a customer image may be identified by utilizing an image identification algorithm, and data of the height, the shape, the measurements and the like of the customer is further detected on the basis of the customer image and shooting parameters of the image acquiring module 1042. For example, the customer image is matched with images of various types of wearing styles in a database, and the wearing style with the highest matching degree is used as the wearing style of the customer. Moreover, a trained wearing style classifier can also be utilized, the customer image can be input into the wearing style classifier and then the wearing style of the customer is detected.

The above-mentioned method of detecting the customer information is exemplary, and is not intended to limit the present disclosure.

By utilizing the customer information to carry out commodity recommendation, the recommended commodity can be matched with the customer better.

In an embodiment, the information sensing unit 104 includes, but is not limited to: at least one (not illustrated) of a human body infrared sensor, a weighing sensor and an ultrasonic sensor.

The human body infrared sensor can detect a human body, and for example, can detect height and shape data and the like of the human body. When the human body infrared sensor is in an array form, a posture of the human body can be detected.

For example, the weighing sensor may be arranged in a customer passing region so as to measure a weight of the customer.

For example, the ultrasonic sensor may also detect the human body, e.g., the height and shape data and the like of the human body.

By the above-mentioned one or more sensors, the customer information can also be detected, and the recommended commodity is determined according to the detected customer information. Then, the image of the recommended commodity is displayed on the transparent display screen 101, and the commodity recommending mark is displayed on the transparent display screen 101 so as to indicate the customer to observe the recommended commodity through the transparent display screen.

In an embodiment, the control display unit can synthesize the first image of the recommended commodity and the second image of the customer passing region into a third image 119 in a case that the second image of the customer passing region includes the customer, and control the transparent display screen 101 to display the third image 119.

When the image of the commodity is provided, the marker points to the real commodity, and thus, the image of the recommended commodity is associated with the actual commodity, so that the customer can observe the virtual and real combined display effect for the commodity, attraction of the commodity to the customer is promoted, and interaction capacity of the smart display apparatus is reinforced.

Therefore, the customer's own image is displayed on the transparent display screen, achieving a virtual wearing effect. Moreover, the commodity recommending mark is displayed on the display screen.

In this embodiment, on the basis of the virtual and real display effect, the customer is further pulled into the image to generate an immersive feeling, thereby promoting interaction between the smart display apparatus and the customer.

Figure 4:
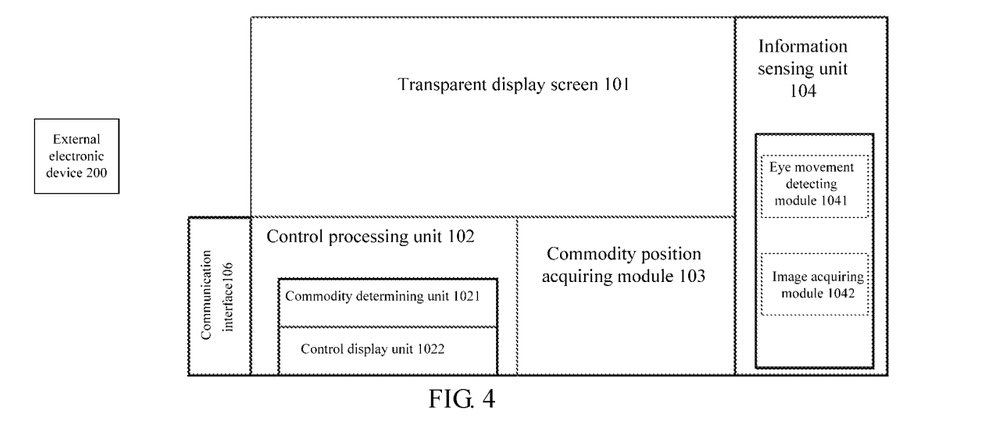
FIG. 4 is a structural diagram of a smart display apparatus provided by yet another embodiment of the present disclosure.

FIG. 4 is a structural diagram of a smart display apparatus provided by yet another embodiment of the present disclosure. As illustrated in FIG. 4, the smart display apparatus 100 further includes a communication interface 106 which is communicatively connected with the control processing unit 102 and configured to receive the customer information from the control processing unit 102 and corresponding information of the recommended commodity and send the customer information and the information of the recommended commodity to an external electronic device 200.

With a communication module, for example, an external electronic device such as a mobile phone held by a user (clerk) or a computer in a store, the customer information can be known, so that the clerk can communicate with the customer better according to the information, thereby excellently interacting with the customer.

In an embodiment, the communication interface is further configured to receive information related to the recommended commodity from the external electronic device and transmit the information to the control processing unit 102.

The external electronic device is, for example, a mobile phone held by the user (clerk) or a computer in the store. At this time, the clerk can directly choose the recommended commodity for the customer by the mobile phone or the computer, and the information related to the recommended commodity is sent to the control processing unit 102. The control processing unit 102 directly displays the recommended commodity according to the received information related to the recommended commodity, and displays the commodity recommending mark.

In an embodiment, the external electronic device is a server with big data processing capacity. The control processing unit 102 sends various detected information, e.g., the customer information detected from the second image and the customer information detected from the sensor, to the server via the communication interface, so that the server can provide an optimal commodity or a combination of recommendations for the customer through big data analysis. For example, the control processing unit matches the information of the customer with commodities in the store, gives the optimal commodity set recommended for the customer through big data analysis according to information stored in a system for the customer, such as preferences, consumption habits, purchase intention of the customer, synthesizes the optimal commodity set with the customer information shot by a camera, stores synthesis information into a memory and displays the synthesis information on the transparent display screen.

In the plurality of embodiments above, it is at least illustrated that the recommended commodity is determined in four modes, such as the customer's attention to the commodities (on the basis of the eye position and the viewing point), the customer information (on the basis of the image acquiring device), the sensor and external recommendation (via the communication interface). Various determination modes of the recommended commodity can be adopted in parallel, and when there is a coincident commodity in the recommended commodities determined in the four modes, the coincident recommended commodity is used as a final recommended commodity. Or, when there is no coincident commodity in the recommended commodities determined in the four modes, the recommended commodity determined in the mode of the customer's attention to the commodities (on the basis of the eye position and the viewing point) is used as the final recommended commodity. Or, the recommended commodities determined in such four modes or one to three modes thereof are sequentially displayed.

Therefore, a strategy of determining the recommended commodity can be flexibly changed as required.

Figure 5:
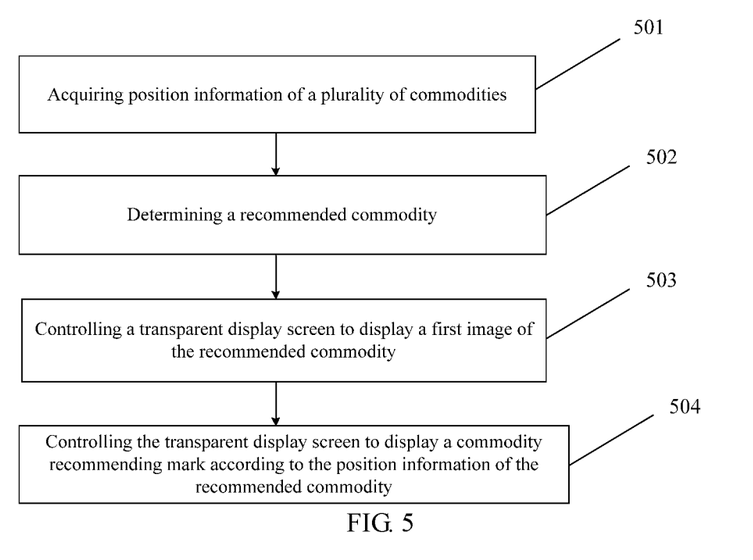
FIG. 5 is a flow chart of a smart display method provided by an embodiment of the present disclosure.

In some embodiments, as illustrated in FIG. 5, there is provided a smart display method, including following steps:

S501: acquiring position information of a plurality of commodities;

S502: determining a recommended commodity;

S503: controlling a transparent display screen to display a first image of the recommended commodity; and S504: controlling the transparent display screen to display a commodity recommending mark according to the position information of the recommended commodity.

An execution sequence of the step S501 and the step S502 can be changed, and the step S501 and the step S502 can also be executed in parallel.

In an embodiment, the smart display method may further include: sensing external reference information related to recommendation of the commodities; and the determining the recommended commodity includes: determining the recommended commodity according to the external reference information.

In an embodiment, the smart display method may further include: detecting an eye position of the customer and a viewing point of the customer on the transparent display screen; and moreover, the determining the recommended commodity further includes: determining a commodity observed by the customer through the transparent display screen, according to the eye position of the customer and the viewing point of the customer that are detected and the position information of the plurality of commodities, and determining the observed commodity as the recommended commodity.

In the smart display method provided by an embodiment, the sensing the external reference information related to recommendation of the commodities may include: acquiring a second image of a customer passing region; and moreover, the determining the recommended commodity includes: acquiring the second image of the customer passing region, judging whether the second image of the customer passing region includes the customer or not, and if the second image of the customer passing region includes the customer, analyzing the second image of the customer passing region to obtain customer information, and determining the recommended commodity according to the customer information.

The recommended commodity is not limited to clothes, and may also be any product capable of being recommended to the customer, such as accessories (bags, glasses and the like), shoes, jewelries and the like.

For example, in the embodiments of the present disclosure, the first image 109 includes a plane view or a perspective view of the recommended commodity, without limited thereto; and the third image 119 includes a virtual wearing image, without limited thereto. For example, on the transparent display screen, the first image 109, the third image 119 and the recommended commodity displayed through the transparent display screen do not overlap, without limited thereto. For example, the first image 109, the third image 119 and the commodity recommending mark 108 do not overlap, without limited thereto.

It should be noted that units and algorithm steps of each example described in connection with the embodiments of the present disclosure can be implemented by electronic hardware, computer software or a combination thereof; and in order to clearly illustrate interchangeability of the hardware and the software, composition and steps of each example have been generally described in the above-mentioned description according to functions. Whether those functions are executed in a hardware or software mode depends on specific applications and design constraints of the technical solutions. For example, different methods may be used to achieve the described functions for each specific application, however, such implementation should not be considered to exceed the scope of the present disclosure.

The steps in the method or in the algorithm that are described in connection with the embodiments of the present disclosure may be implemented by hardware, a software unit executed by a processor or a combination thereof. The software unit may be disposed in an RAM, a memory, an ROM, an electrical programmable ROM, an electrical erasable programmable ROM, a register, a hard disk, a removable disk, a CD-ROM (Compact Disc-ROM) or any storage media in other forms, as known in the technical arts.

The smart display apparatus provided by the embodiment of the present disclosure may further include one or more processors and one or more memories. The processor may process data signals and may include various computing architectures such as a complex instruction set computer (CISC) architecture, a reduced instruction set computer (RISC) architecture or an architecture for implementing a combination of multiple instruction sets. The memory may store instructions and/or data executed by the processor. The instructions and/or data may include codes which are configured to achieve some functions or all the functions of one or more devices in the embodiments of the present disclosure. For instance, the memory includes a dynamic random access memory (DRAM), a static random access memory (SRAM), a flash memory, an optical memory or other memories well known to those skilled in the art.

In some embodiments of the present disclosure, the control processing unit, the commodity position acquiring module, the commodity determining unit, the control display unit, the information sensing unit, the eye movement detecting module, and/or image acquiring module include codes and programs stored in the memories; and the processors may execute the codes and the programs to achieve some functions or all the functions of the control processing unit, the commodity position acquiring module, the commodity determining unit, the control display unit, the information sensing unit, the eye movement detecting module, and/or image acquiring module.

In some embodiments of the present disclosure, the control processing unit, the commodity position acquiring module, the commodity determining unit, the control display unit, the information sensing unit, the eye movement detecting module, and/or image acquiring module may be specialized hardware devices and configured to achieve some or all the functions of the control processing unit, the commodity position acquiring module, the commodity determining unit, the control display unit, the information sensing unit, the eye movement detecting module, and/or image acquiring module. For instance, t the control processing unit, the commodity position acquiring module, the commodity determining unit, the control display unit, the information sensing unit, the eye movement detecting module, and/or image acquiring module may be a circuit board or a combination of a plurality of circuit boards and configured to achieve the above functions. In embodiments of the present disclosure, the circuit board or a combination of the plurality of circuit boards may include: (1) one or more processors; (2) one or more non-transitory computer-readable memories connected with the processors; and (3) processor-executable firmware stored in the memories.

The above are merely specific implementations of the present disclosure without limiting the protection scope of the present disclosure thereto. Any changes or substitutions easily occur to those skilled in the art within the technical scope of the present disclosure should be covered in the protection scope of the present disclosure. Therefore, the protection scope of the present disclosure should be based on the protection scope of the appended claims.

What is claimed is:

1. A smart display apparatus, comprising:
a transparent display screen;
a commodity position acquiring module configured to acquire position information of a plurality of commodities; and
a control processing unit comprising a commodity determining unit and a control display unit,
wherein the commodity determining unit is configured to determine a recommended commodity; and the control display unit is configured to control the transparent display screen to display a first image of the recommended commodity, and is configured to control the transparent display screen to display a commodity recommending mark according to the position information of the recommended commodity so as to indicate a customer to observe the recommended commodity through the transparent display screen, and the control display unit is configured to control the transparent display screen to simultaneously display the commodity recommending mark and the first image of the recommended commodity so that the first image of the recommended commodity is associated with the recommended commodity that is actual.

2. The smart display apparatus according to claim 1, wherein the commodity recommending mark is a frame, an interior of the frame is transparent, and the recommended commodity is included in the frame.

3. The smart display apparatus according to claim 1, further comprising an information sensing unit configured to sense external reference information related to recommendation of the commodities,
wherein the commodity determining unit is configured to determine the recommended commodity according to the external reference information.

4. The smart display apparatus according to claim 3, wherein the information sensing unit comprises an eye movement detecting module, and the eye movement detecting module is configured to detect an eye position of the customer and a viewing point of the customer on the transparent display screen.

5. The smart display apparatus according to claim 4, wherein the commodity determining unit is further configured to:
determine a commodity observed by the customer through the transparent display screen, according to the eye position and the viewing point of the customer, which are detected by the eye movement detecting module, and the position information of the plurality of commodities, and
determine the observed commodity as the recommended commodity; or
the commodity determining unit is further configured to:
connect the eye position with the viewing point of the customer, prolong a connection line of the eye position and the viewing point, and determine a commodity intersected with a prolonged line of the connection line as the recommended commodity.

6. The smart display apparatus according to claim 4, wherein the frame is provided with the viewing point as a center.

7. The smart display apparatus according to claim 3, wherein the information sensing unit comprises an image acquiring module configured to acquire a second image of a customer passing region,
wherein the commodity determining unit is further configured to: acquire the second image, judge whether the second image of the customer passing region includes the customer or not, and if the second image of the customer passing region includes the customer, analyze the second image of the customer passing region to obtain customer information, and determine the recommended commodity according to the customer information.

8. The smart display apparatus according to claim 7, wherein the control display unit is further configured to:
synthesize the first image of the recommended commodity and the second image of the customer passing region into a third image, in a case that the second image of the customer passing region includes the customer; and
control the transparent display screen to display the third image.

9. The smart display apparatus according to claim 8, wherein the third image comprises a virtual wearing image, the first image comprises a plane view or a perspective view of the recommended commodity, and
on the transparent display screen, the first image, the third image, and the recommended commodity displayed through the transparent display screen do not overlap.

10. The smart display apparatus according to claim 3, wherein the information sensing unit comprises: at least one selected from a group consisting of a human body infrared sensor, a weighing sensor and an ultrasonic sensor, wherein the control processing unit comprises a processor or an electronic chip.

11. The smart display apparatus according to claim 7, further comprising a communication interface communicatively connected to the control processing unit, wherein the communication interface is configured to:
receive the customer information from the control processing unit and information of the recommended commodity, and send the customer information and the information of the recommended commodity to an external electronic device; and/or
receive information related to the recommended commodity from the external electronic device, and transmit the information related to the recommended commodity to the control processing unit.

12. The smart display apparatus according to claim 8, wherein the first image, the third image, and the commodity recommending mark do not overlap.

13. The smart display apparatus according to claim 1, wherein the commodity position acquiring module comprises a storage device, or the commodity position acquiring module comprises a Radio Frequency Identification (RFID) attached to a commodity and a plurality of RF readers arranged on the smart display apparatus.

14. A smart display method, comprising:
acquiring position information of a plurality of commodities;
determining a recommended commodity;
controlling a transparent display screen to display a first image of the recommended commodity; and
controlling the transparent display screen to display a commodity recommending mark according to the position information of the recommended commodity so as to indicate a customer to observe the recommended commodity through the transparent display screen, and the control display unit is configured to control the transparent display screen to simultaneously display the commodity recommending mark and the first image of the recommended commodity so that the first image of the recommended commodity is associated with the recommended commodity that is actual.

15. The smart display method according to claim 14, further comprising: sensing external reference information related to recommendation of the commodities, wherein the determining the recommended commodity comprises: determining the recommended commodity according to the external reference information.

16. The smart display method according to claim 15, wherein the sensing the external reference information related to recommendation of the commodities comprises: acquiring a second image of a customer passing region,
wherein the determining the recommended commodity comprises: acquiring the second image of the customer passing region, judging whether the second image of the customer passing region includes the customer or not, and if the second image of the customer passing region includes the customer, analyzing the second image of the customer passing region to obtain customer information, and determining the recommended commodity according to the customer information.

17. The smart display method according to claim 16, further comprising:
synthesizing the first image of the recommended commodity and the second image of the customer passing region into a third image, in a case that the second image of the customer passing region includes the customer; and
controlling the transparent display screen to display the third image,
wherein the third image comprises a virtual wearing image, the first image comprises a plane view or a perspective view of the recommended commodity, and on the transparent display screen, the first image, the third image, and the recommended commodity displayed through the transparent display screen do not overlap.

18. The smart display method according to claim 17, wherein the first image, the third image, and the commodity recommending mark do not overlap.

19. The smart display method according to claim 14, further comprising: detecting an eye position of the customer and a viewing point of the customer on the transparent display screen,
wherein the determining the recommended commodity further comprises: determining a commodity observed by the customer through the transparent display screen, according to the eye position and viewing point of the customer that are detected and the position information of the plurality of commodities, and determining the observed commodity as the recommended commodity.

20. The smart display method according to claim 14, wherein the transparent display screen is located between the customer passing region and the plurality of commodities.

* * * * *